United States Patent
Urashima

(10) Patent No.: US 11,869,197 B2
(45) Date of Patent: Jan. 9, 2024

(54) INFORMATION PROCESSING APPARATUS, VIDEO SYNOPSIS METHOD, AND STORAGE MEDIUM FOR VIDEO SYNOPSIS

(71) Applicant: CANON KABUSHIKI KAISHA, Tokyo (JP)

(72) Inventor: Hiroki Urashima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 253 days.

(21) Appl. No.: 17/124,258

(22) Filed: Dec. 16, 2020

(65) Prior Publication Data
US 2021/0192749 A1 Jun. 24, 2021

(30) Foreign Application Priority Data
Dec. 24, 2019 (JP) .................. 2019-233228

(51) Int. Cl.
*G06T 7/20* (2017.01)
*G06T 3/00* (2006.01)
*G06V 20/40* (2022.01)

(52) U.S. Cl.
CPC .......... *G06T 7/20* (2013.01); *G06T 3/0087* (2013.01); *G06V 20/40* (2022.01); *G06T 2207/10016* (2013.01); *G06T 2207/30241* (2013.01)

(58) Field of Classification Search
CPC .............. G06T 7/20; G06T 3/0087; G06T 2207/10016; G06T 2207/30241; G06T 2207/30232; G06T 7/246; G06V 20/40; G06V 20/47; G06V 20/52
See application file for complete search history.

(56) References Cited

U.S. PATENT DOCUMENTS

| | | | |
|---|---|---|---|
| 8,102,406 B2* | 1/2012 | Peleg | H04N 5/2625 345/474 |
| 2016/0086039 A1* | 3/2016 | Diot | G06T 7/60 382/103 |
| 2016/0117827 A1* | 4/2016 | Bae | G06V 20/52 382/103 |
| 2016/0232234 A1* | 8/2016 | Baek | G11B 27/031 |
| 2019/0132510 A1* | 5/2019 | Beach | G06V 20/41 |

FOREIGN PATENT DOCUMENTS

JP 5355422 B2 11/2013

* cited by examiner

*Primary Examiner* — Amara Abdi
(74) *Attorney, Agent, or Firm* — Canon U.S.A., Inc. IP Division

(57) ABSTRACT

An information processing apparatus includes a specification unit, a determination unit, and a generation unit. The specification unit specifies a relationship between a plurality of objects detected in a video. The determination unit determines arrangement of motion trajectories of the plurality of objects, the relationship between which has been specified by the specification unit, while maintaining a relative appearance order in the video and avoiding an overlap of the motion trajectories in a temporal direction. The generation unit generates a summary video of the video based on the arrangement determined by the determination unit.

9 Claims, 14 Drawing Sheets

FIG.4A

| IDENTIFIER | TYPE | START TIME | MOTION TRAJECTORY |
|---|---|---|---|
| ID_001 | PERSON | 10 | B1 |
| ID_002 | AUTOMOBILE | 20 | B2 |
| ID_003 | PERSON | 90 | B3 |
| ID_004 | PERSON | 130 | B4 |
| ID_005 | AUTOMOBILE | 160 | B5 |

FIG.4B

| TIME | CENTER COORDINATES | RADIUS | PIXEL MASK |
|---|---|---|---|
| 0 | (x0,y0) | r0 | M0 |
| 1 | (x1,y1) | r1 | M1 |
| 2 | (x2,y2) | r2 | M2 |
| ... | ... | ... | ... |
| 12 | (x12,y12) | r12 | M12 |

FIG.5

| OBJECT IDENTIFIER | RELATION |
|---|---|
| ID_001 | ID_002 |

FIG.6

| OBJECT IDENTIFIER | START TIME IN SUMMARY VIDEO |
|---|---|
| ID_001 | 0 |
| ID_002 | 10 |
| ID_003 | 50 |
| ID_004 | 100 |

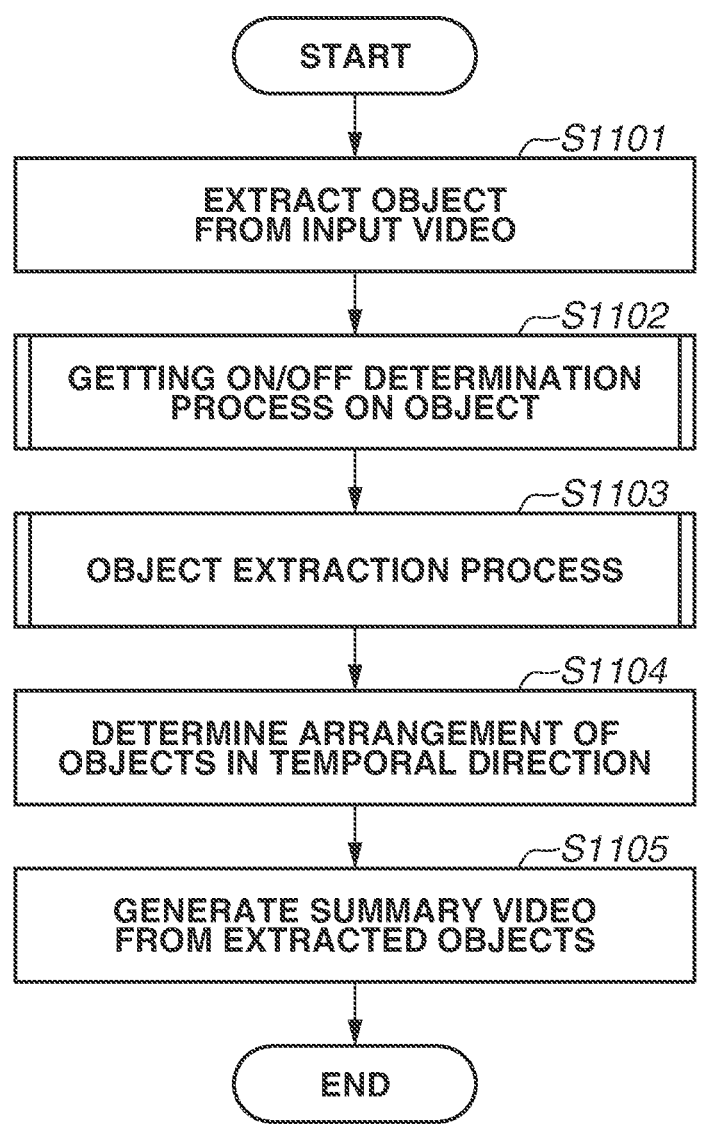

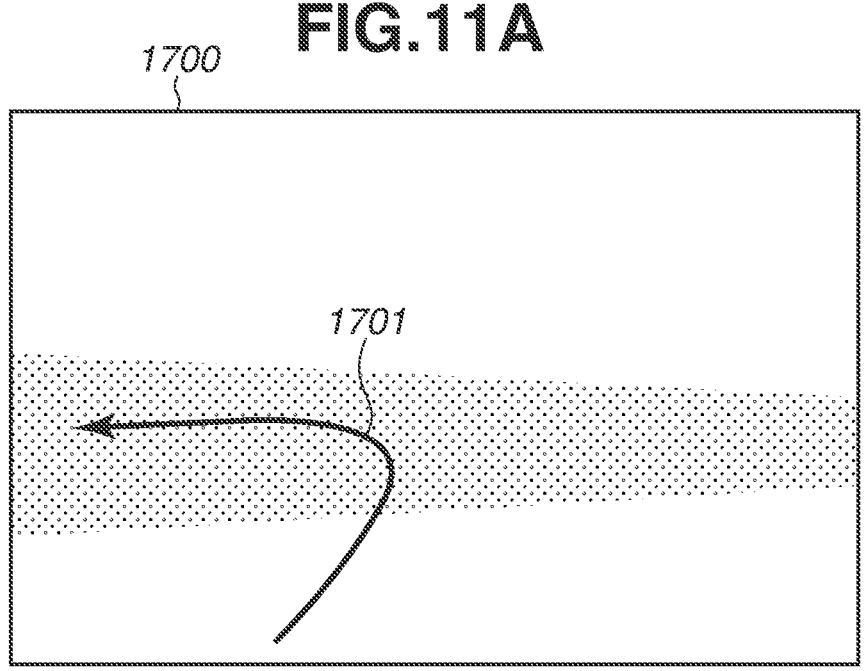
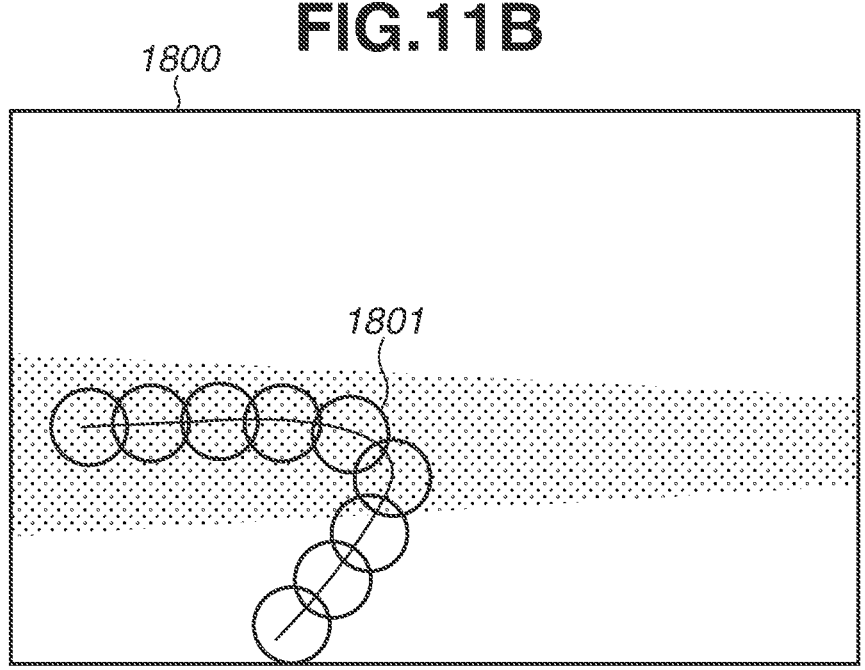

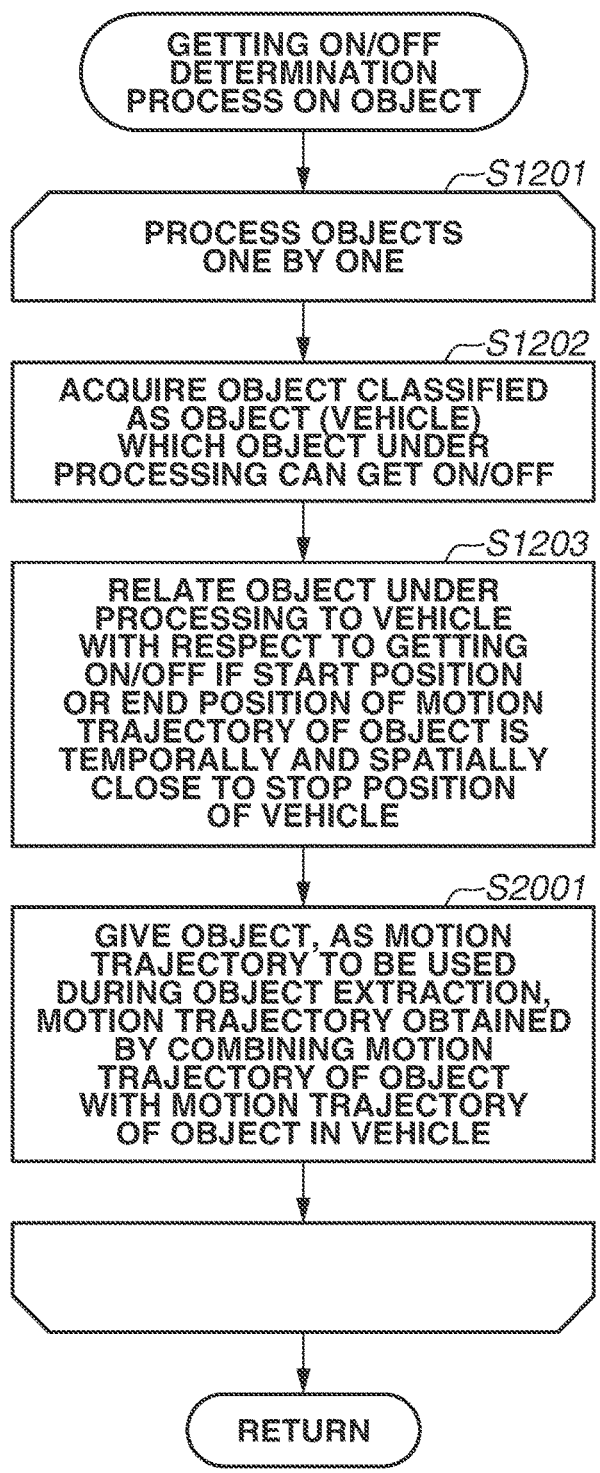
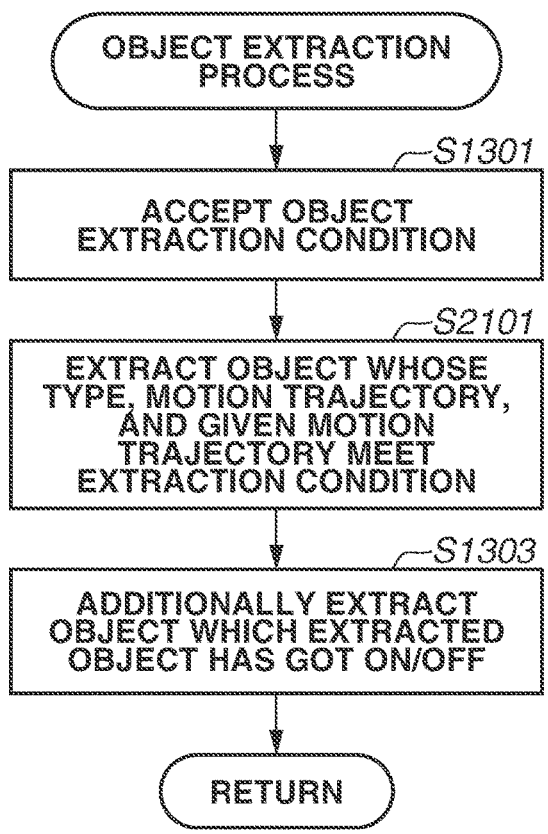

FIG.14A

| IDENTIFIER | TYPE | START TIME | MOTION TRAJECTORY |
|---|---|---|---|
| ID_001 | PERSON | 5 | B7 |
| ID_002 | MOTORCYCLE | 13 | B8 |
| ID_003 | AIRPLANE | 20 | B9 |
| ID_004 | SHIP | 67 | B10 |
| ID_005 | TRUCK | 69 | B11 |

FIG.14B

| OBJECT IDENTIFIER | RELATION |
|---|---|
| ID_001 | ID_002 |
| ID_002 | ID_004 | ns
INFORMATION PROCESSING APPARATUS, VIDEO SYNOPSIS METHOD, AND STORAGE MEDIUM FOR VIDEO SYNOPSIS

BACKGROUND

Technical Field

One disclosed aspect of the embodiments relates to an information processing apparatus, a video synopsis method, and a storage medium.

Description of the Related Art

In recent years, awareness of crime prevention is enhanced and surveillance cameras are used in various places.

Japanese Patent No. 5355422 discusses a video synopsis technology as a method of efficiently viewing a video recorded by such a surveillance camera for a long period of time. According to the discussed technology, moving objects, such as people and vehicles, are initially extracted from a long-time recorded video (hereinafter referred to as an "original video"). Then, the objects are shifted in a temporal direction while maintained in spatial positions preventing an overlap of the objects, to change an appearance order of the objects. Thus, the long-time video is converted to a short-time video (hereinafter referred to as a "summary video").

If, however, a summary video is generated from the recorded video, in which a person gets on/off an automobile, the person and the automobile, which the person has got on/off, are recognized as separate objects. Consequently, the person and the automobile, which the person has got on/off, do not necessarily appear in the summary video at a time, and a strange video, in which a person appears out of nowhere or suddenly disappears, may be displayed. This situation may cause confusion to observers of the summary video and may lead to undesirable effects.

SUMMARY

According to an aspect of the embodiments, an information processing apparatus includes a specification unit, a determination unit, and a generation unit. The specification unit is configured to specify a relationship between a plurality of objects detected in a video. The determination unit is configured to determine arrangement of motion trajectories of the plurality of objects, the relationship between which has been specified by the specification unit, while maintaining a relative appearance order in the video and avoiding an overlap of the motion trajectories in a temporal direction. The generation unit is configured to generate a summary video of the video based on the arrangement determined by the determination unit.

Further features of the disclosure will become apparent from the following description of exemplary embodiments with reference to the attached drawings.

BRIEF DESCRIPTION OF THE DRAWINGS

FIGS. 4A and 4B are diagrams each illustrating a table indicating an example of object information received by a reception unit according to the exemplary embodiment.

FIG. 5 is a diagram illustrating a table indicating an example of relation information of an object, which is generated by a determination unit according to the exemplary embodiment.

FIG. 6 is a diagram illustrating a table indicating an example of a start time of an object, which is generated by the generation unit according to the exemplary embodiment.

FIG. 7 is a flowchart illustrating an example of processing performed by the control unit according to the exemplary embodiment.

FIG. 11A is a diagram, in which an example of a hand-drawn line accepted by an extraction unit in the first modification of the exemplary embodiment is plotted on a background screen, and FIG. 11B is a diagram, in which an example of a trajectory by the accepted hand-drawn line is plotted on a background screen.

FIG. 13A is a flowchart illustrating an example of processing performed by the determination unit in the first modification of the exemplary embodiment, and FIG. 13B is a flowchart illustrating an example of processing performed by the extraction unit in the first modification of the exemplary embodiment.

FIG. 14A is a diagram illustrating a table indicating an example of object information received by the reception unit in the first modification of the exemplary embodiment, and FIG. 14B is a diagram illustrating a table indicating an example of relation information of an object, which is generated by the determination unit in the first modification of the exemplary embodiment.

DESCRIPTION OF THE EMBODIMENTS

The following detailed description is made on an exemplary embodiment for the implementation of the disclosure with reference to the accompanying drawings. The exemplary embodiment described below is to implement the disclosure.

The disclosure should appropriately be revised or modified according to a configuration of an apparatus, to which the disclosure is applied, and various conditions, so that the disclosure is not limited to the exemplary embodiment below.

In addition, not all the combinations of features described in the present exemplary embodiment are necessary for the implementation of the disclosure.

In the exemplary embodiment of the disclosure, description is made on an example of a system that generates, from a video (original video) shot by a surveillance camera, a summary video as a video compressed in a temporal direction. Use of the generated summary video allows a user to view a long-time video in a reduced time.

To solve the issue of sudden appearance or disappearance of a person in a summary video, the exemplary embodiment of the disclosure has such a configuration that, in a case where it is detected that a person gets on/off an automobile, a summary video, in which the person and the automobile related to the person appear in a relative appearance order unchanged from the original video, is generated. Objects are classified into various types such as a person and an automobile, which will be detailed below.

Figure 1A:
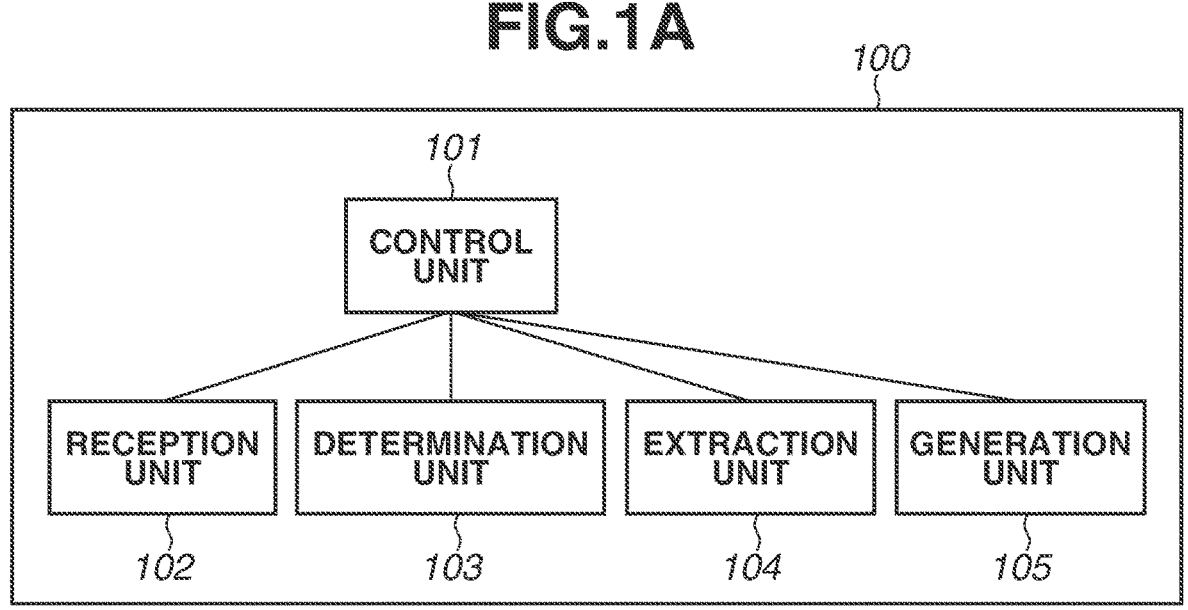
FIGS. 1A and 1B are functional block diagrams of a video generation device as an example of an information processing apparatus according to an exemplary embodiment.

FIG. 1A is a functional block diagram of a video generation device as an example of an information processing apparatus 100 according to the present exemplary embodiment. The video generation device includes a control unit 101, a reception unit 102, a determination unit 103, an extraction unit 104, and a generation unit 105.

Figure 1B:
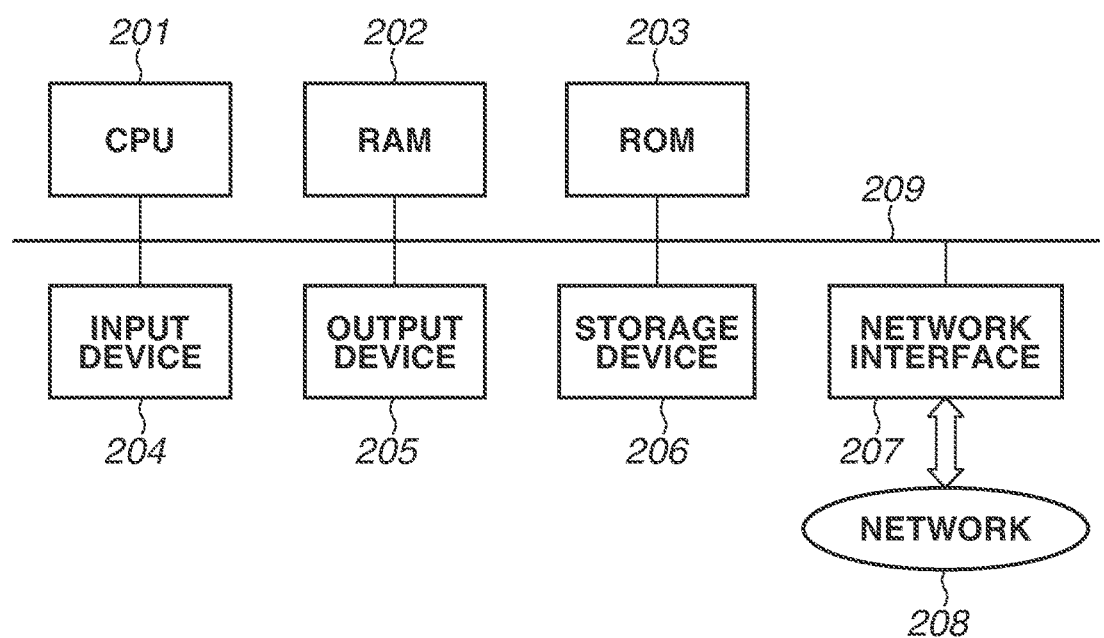

FIG. 1B is a diagram illustrating a hardware configuration of the information processing apparatus 100. As illustrated in FIG. 1B, the information processing apparatus 100 includes, as the hardware, a central processing unit (CPU) 201, a random access memory (RAM) 202, a read only memory (ROM) 203, an input device 204, an output device 205, a storage device 206, and a network interface 207.

The control unit 101 is a functional unit including the CPU 201, and reads a program or data stored in the ROM 203 to the RAM 202 to perform a video generation process and the like. The video generation process includes a number of operations described in the following such as the flowcharts shown in FIGS. 7, 8A, 8B, 13A, and 13B. These operations may further correspond to the functional units, modules, or programs such as the reception unit 102, the determination unit 103, the extraction unit 104, and the generation unit 105.

The reception unit 102 receives a plurality of pieces of object information as a result of an analytic process performed on a video by, for instance, a user's operation through the input device 204 including a keyboard or a mouse.

The video, which is an original video as a target for analytic processing, can be a video stored in the storage device 206 or a video on a network 208 that is read through the network interface 207.

The determination unit 103 determines a relationship between objects obtained from a video, such as the relationship between a person and an automobile with respect to the getting on/off.

The extraction unit 104 extracts a plurality of objects based on an extraction condition given by a user's operation through the input device 204 including a keyboard or a mouse and the relationship between the objects.

The generation unit 105 generates a summary video based on the relationship between the extracted plurality of objects. The generated summary video is stored in the storage device 206 and reproduced on the output device 205 such as a display.

Figure 2A:
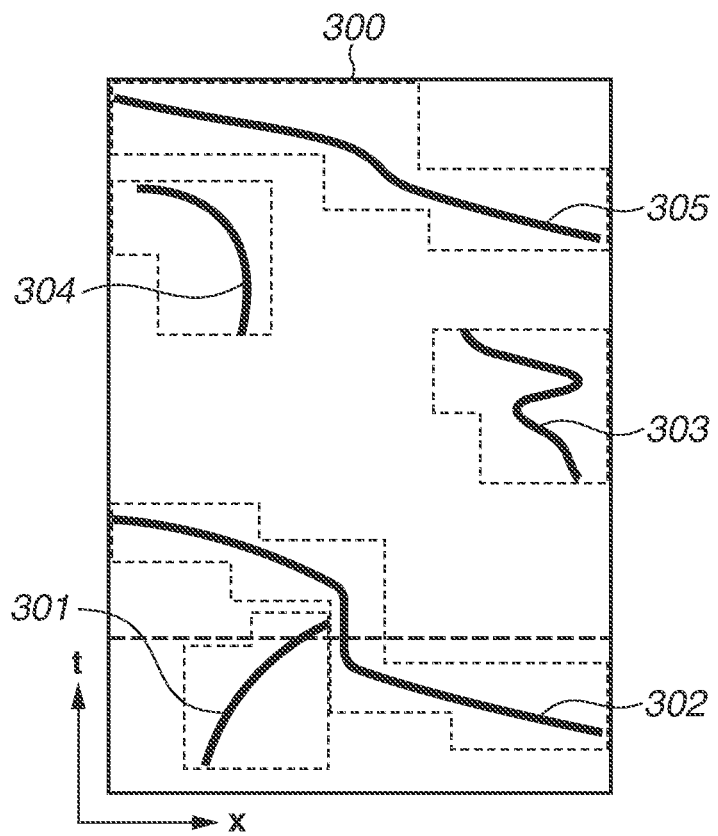
FIG. 2A is a diagram illustrating an exemplary arrangement of motion trajectories of objects in time and space of a recorded video according to the exemplary embodiment.

FIG. 2A is a diagram illustrating an arrangement 300 of motion trajectories of objects in time and space of an original video. A horizontal axis represents space and a vertical axis represents time. Space is generally defined on two axes, x-axis and y-axis. In the present exemplary embodiment, values on the y-axis are omitted for comprehensibility, and description is made assuming that space is of one-dimensional and is only defined on the x-axis. As to time t, a lower end of the vertical axis corresponds to a start time of recording and an upper end thereof corresponds to an end time of recording. Motion trajectories 301 to 305 illustrated in the figure with bold lines each indicate a trajectory of the center of an object that appears in the video. Dotted lines around each motion trajectory represent a range of an object.

The information processing apparatus 100 defines an object by a collection of pixels occurring in each of a plurality of successive frames. The information processing apparatus 100 also defines the range of an object by a radius of a circle whose center is coincident with the center of the object. The center of the object is assumed to be a center position of the collection of the pixels of the object. The radius, which indicates the range of the object, is calculated based on the area of the collection of the pixels of the object. The method for such calculation will be detailed below.

It is assumed that a user sets "person" as an extraction condition. In FIG. 2A, the motion trajectories 301, 303, and 304 are each assumed to be a motion trajectory of a person, and the motion trajectories 302 and 305 are each assumed to be a motion trajectory of an automobile. It is also assumed that a person with the motion trajectory 301 gets on an automobile with the motion trajectory 302. The time, which is indicated in FIG. 2A with a broken line, represents a time immediately before the time when the person gets on the automobile. The screen of the original video at that time will be described below.

Figure 2B:
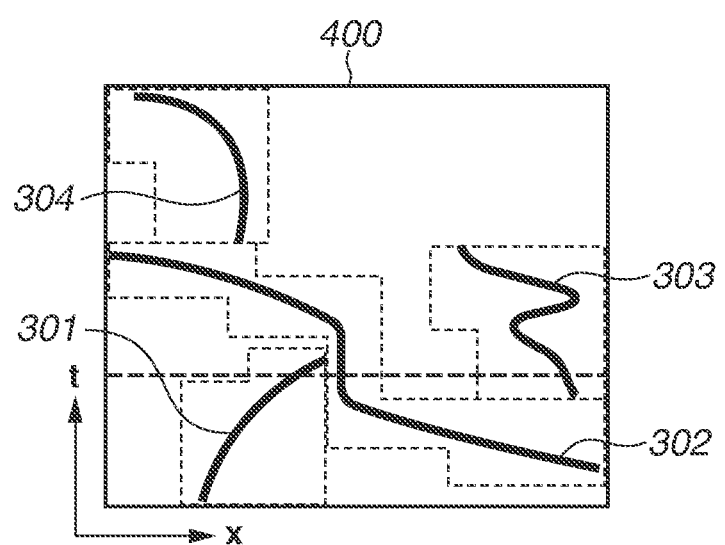
FIG. 2B is a diagram illustrating an exemplary arrangement of motion trajectories of objects in time and space of a summary video according to the exemplary embodiment.

FIG. 2B illustrates an arrangement 400 of motion trajectories of objects in time and space of a summary video. In FIG. 2B, motion trajectories 301 to 304 are the same as the motion trajectories 301 to 304 in FIG. 2A, but each have a start time shifted from the start time in FIG. 2A.

The start time of a motion trajectory refers to the time when an object appears in an angle of view and starts forming a motion trajectory, when the start time of a video is set at null.

The arrangement 400 in FIG. 2B is a rearrangement of a group of objects extracted from the objects in FIG. 2A, namely, the person and the automobile, which the person has got on/off.

During the determination of the arrangement, the start time of each motion trajectory is determined so that the reproduction time is reduced as compared with the reproduction time of the original video while the relative appearance order of the motion trajectories of the person and the automobile related to each other with respect to the getting on/off is not changed and a relative arrangement in the temporal direction and a spatial direction in the original video is maintained. The appearance order is the order of appearance of the objects with respect to time. The relative appearance order is the order of appearance of objects with respect to each other.

The motion trajectory 305 in FIG. 2A is a motion trajectory of an automobile, which no person gets on/off, unlike the case with the motion trajectory 302. Thus, the object with the motion trajectory 305 is not related to any person and does not apply to the extraction condition, so that the object with the motion trajectory 305 has not been extracted in FIG. 2B.

Figure 3A:
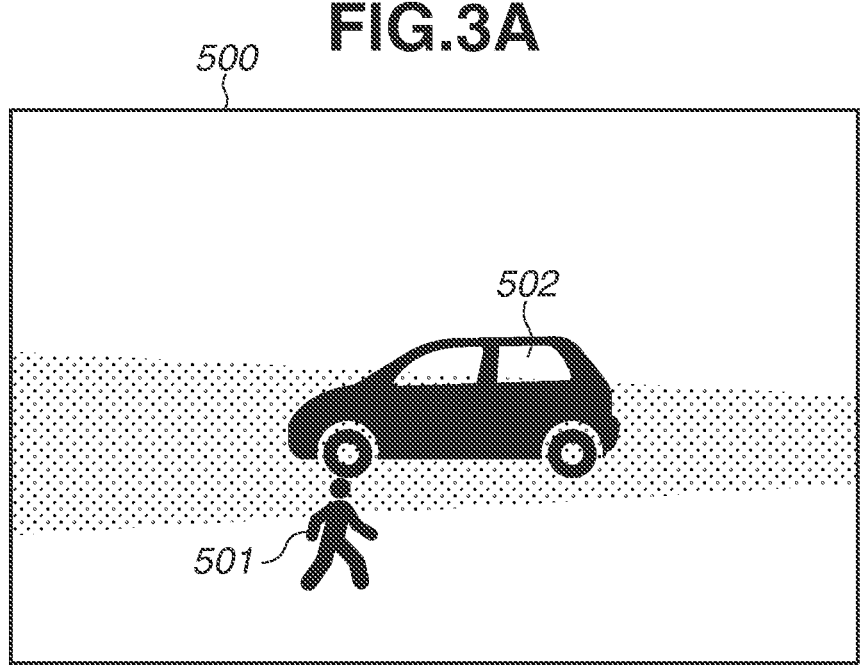
FIG. 3A is a diagram illustrating an exemplary frame of a video accepted by a control unit according to the exemplary embodiment.

FIG. 3A illustrates an exemplary frame of a video accepted by the control unit 101. The frame illustrated in FIG. 3A is the frame at the time indicated in FIG. 2A with a broken line. A person 501 corresponds to the object with the motion trajectory 301 and an automobile 502 to the object with the motion trajectory 302. The figure illustrates a screen that is displayed immediately before the person 501 walking toward an upper right side gets on the automobile 502, which has traveled from the right toward the left.

Figure 3B:
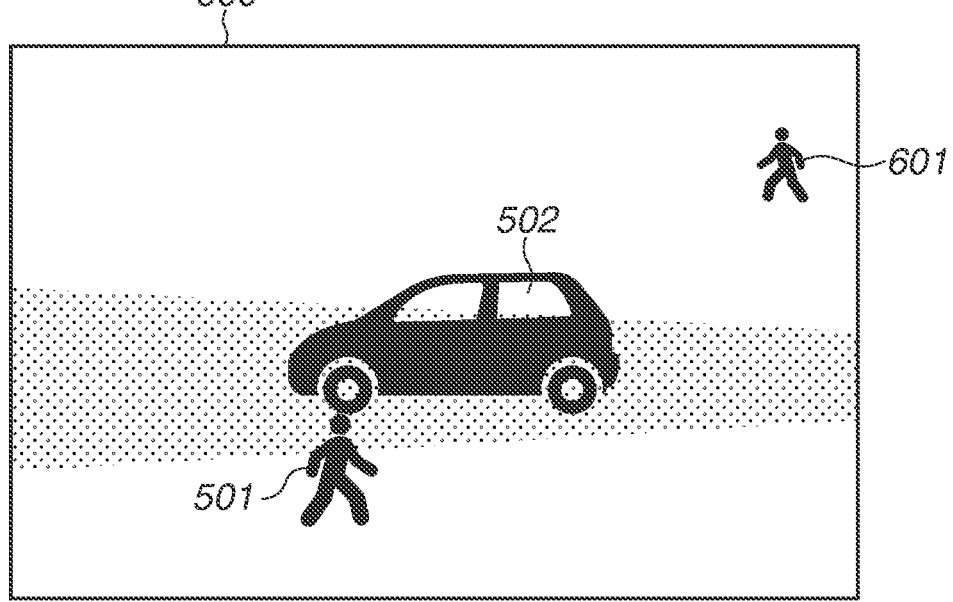
FIG. 3B is a diagram illustrating an exemplary frame of a summary video output by a generation unit according to the exemplary embodiment.

FIG. 3B illustrates an exemplary frame of a summary video output by the generation unit 105. The frame illustrated in FIG. 3B is the frame at the time indicated in FIG. 2B with a broken line. A person 601 corresponds to the object with the motion trajectory 303.

During the generation of the summary video, the automobile 502, which the person 501 has got on, is added as an object to appear in the summary video. In addition, the appearance order of the person 501 and the automobile 502 is kept unchanged so as to maintain the relative arrangement in the temporal direction in the recorded video.

In such manner, the relationship between the person 501 and the automobile 502 in the recorded video in FIG. 3A with respect to relative positions in the temporal direction is maintained even in FIG. 3B illustrating the summary video. Moreover, as illustrated in FIG. 3B, the person 601, who has been video-recorded at a different time, is included in the summary video as a result of video synopsis.

An example of object information received by the reception unit 102 is explained using a table illustrated in FIG. 4A.

A table 700 of FIG. 4A represents an object information table generated by the video generation device from a video and received by the reception unit 102. The object information table includes an identifier in a column 701, the type in a column 702, the start time in a column 703, and the motion trajectory in a column 704.

To the objects with the motion trajectories 301, 302, 303, 304, and 305 in the original video in FIG. 2A, identifiers ID_001, ID_002, ID_003, ID_004, and ID_005 are respectively assigned.

The type of an object is estimated, by an image recognition technology such as object recognition, from an exterior of the object found in an image of the object appearing in a frame and allocated to the object.

While the object recognition is used for classifying the types in the present exemplary embodiment, any method is usable as long as the method is for classifying types of objects based on an image or a motion trajectory of each of the objects. The start time of an object refers to the time when the object appears in the angle of view, when the start time of a video is set at null. The motion trajectory will be explained with reference to FIG. 4B.

An example of a motion trajectory received by the reception unit 102, which receives a plurality of pieces of object information as a result of the analytic processing performed on a video by, for instance, a user's operation, is explained using a table illustrated in FIG. 4B.

A motion trajectory table 800 of an object is received from the reception unit 102 along with the object information table 700. The motion trajectory table illustrated in FIG. 4B is a motion trajectory table indicated with B1 in the column 704 of the motion trajectory of the object information table 700 in FIG. 4A. As there are also motion trajectory tables in regard to B2 to B5, detailed descriptions thereof are omitted.

The motion trajectory table 800 includes pieces of information, namely, the time in column 801, the center coordinates in a column 802, the radius in a column 803, and a pixel mask in a column 804, and stores information of individual frames in time series.

The time in the column 801 refers to a relative time after the appearance of an object in a video. In the motion trajectory table 800, motion trajectories at time 0 through time 12 of the object with the identifier ID_001 are stored. The numbers 0 to 12 of the time are assumed numbers. Actually, the time is of a numerical value according to a frame rate.

The center coordinates in the column 802 represent the center position of the pixel collection of an object for each time. The mean of coordinates of all the pixels constituting an image of the object is used as the center position.

The radius in the column 803 represents the range of an object. The radius is calculated by taking a square root of $S/\pi$, where S represents the total number of pixels of the object. In the present exemplary embodiment, the range of an object is approximated with a circle, but any method is available as long as the method allows the specification of the range.

The pixel mask in the column 804 represents a link to mask information indicating detailed pixel positions of an object in a frame. In the present exemplary embodiments, the pixel mask is constituted of an image having information that distinguishes an object from other objects, while any form other than the image is available as long as the form allows such distinguishing.

Figure 5:
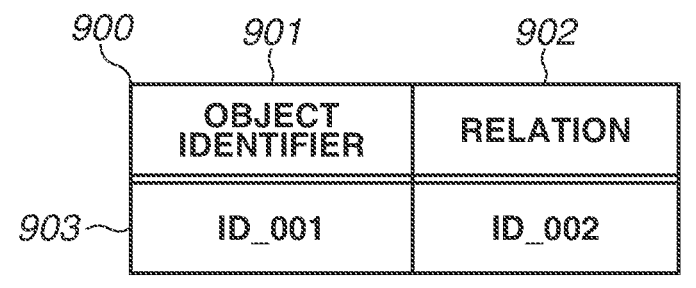

An example of a relation information table of an object that is generated by the determination unit 103 is explained using a table illustrated in FIG. 5.

A relation information table 900 of an object is information generated by the determination unit 103 based on the object information and the motion trajectory.

The relation information of an object includes the identifier of the object in a column 901 and the relation in a column 902, both corresponding to the identifier in the column 701 in FIG. 4A. In the column 901 for the identifier of an object, the identifier of an object (person) determined to have carried out the getting on/off is written and, in the column 902 for the relation, the object (automobile), which the object (person) has got on/off, is written. In the illustrated example, the ID_002 of the object with the motion trajectory 302, which the object with the motion trajectory 301 has got on/off, is written as a relation to the identifier ID_001 of the object with the motion trajectory 301.

An example of a start time table of objects in a summary video generated by the generation unit 105 is explained using a table illustrated in FIG. 6. A start time table 1000 of objects is information generated by the generation unit 105 based on the extracted objects and the relation information table 900 of the objects.

The start time table 1000 of objects includes pieces of information, namely, the identifier of an object in a column 1001 and the start time in a summary video in a column 1002. The identifier of an object in the column 1001 corresponds to the identifier in the column 701 in FIG. 4A. The start time in a summary video in the column 1002 refers to the time when an object appears in the summary video. In the following, a flowchart is used to explain a method of generating the arrangement in the summary video of FIG. 2B from FIG. 2A.

The flowchart according to the present exemplary embodiment is realized by performing processing with the CPU 201, which loads a required program onto the RAM 202 from the ROM 203 to execute the program.

FIG. 7 is a flowchart illustrating an example of processing performed in the control unit 101 in the present exemplary embodiment. The flowchart is performed in the video generation device when a video recorded by the surveillance camera is read.

In step S1101, the control unit 101 acquires, from the reception unit 102, an object information table about an object extracted from the original video, and the processing proceeds to step S1102.

While there are several methods of cutting an object from the original video, the present exemplary embodiment employs the method in which a background difference and a difference between frames are combined together. Another method can also be used as long as the method is for extracting an object from a video.

The information on an object includes the object information table illustrated in FIG. 4A and the motion trajectory table illustrated in FIG. 4B. An identifier is allocated to the extracted object, type information of the object as estimated from an image is recorded in the column of the type, the time when the object appears in the recorded video is recorded in the column of the start time, and the relative time, center coordinates, radius, and pixel mask of the object are recorded in the tables.

In step S1102, the control unit 101 causes the determination unit 103 to perform a determination process for determining the object's getting on/off described below, and the like, and the processing proceeds to step S1103. In step S1102, objects are related to each other in a case where an event such as the getting on/off has occurred between the objects. In the present exemplary embodiment, the object with the motion trajectory 301 is related to the object with the motion trajectory 302, that is to say, it is determined that a person has got on/off an automobile.

In step S1103, an object extraction process described below is performed in the extraction unit 104, and the processing proceeds to step S1104.

In step S1103, objects are extracted based on the input extraction condition and the relation information of the objects.

In the present exemplary embodiment, "person" is input as an extraction condition, so that the objects with the motion trajectories 301, 303, and 304, whose types are each classified as a person, are initially extracted, then the automobile with the motion trajectory 302, which is related to the object with the motion trajectory 301, is additionally extracted to be specified based on the relation information.

In step S1104, the generation unit 105 determines the arrangement of the objects in the temporal direction based on the object information table 700 and the relation information table 900 of the objects to generate the start time table 1000 of the objects, and the processing proceeds to step S1105.

In step S1104, first of all, the relative arrangement in the temporal direction of the object with the motion trajectory 301 and the object with the motion trajectory 302 related to the object with the motion trajectory 301 is determined. On the objects with the motion trajectories 301 and 302 among the extracted objects, the relation information exists.

As seen from the object information table 700, the start time of the object with the motion trajectory 301 is 10 and the start time of the object with the motion trajectory 302 is 20 in the original video, so that the relative arrangement is determined to be 10 from the difference. Such relative arrangement in the temporal direction in the original video is maintained. Next, the start time in the summary video is determined for the objects with the motion trajectories 301, 302, 303, and 304.

In this regard, description is made on a collision between motion trajectories of objects. The generation unit 105 calculates a collision cost $Col_{ij}(k)$ between an object i and an object j using an equation (1) below.

In the equation, k is the time difference between the start time of the object i and the start time of the object j, $x_t^i$ and $y_t^i$ are the x-coordinate and the y-coordinate of the object i at the time t, respectively, and $r_t^i$ is a radius of the object i at the time t.

Further, $T_{ij}(k)$ represents a period of time, during which both of motion trajectories of the objects i and j appear in a video, when the time difference between the start times is assumed to be k. The numerical expression inside an absolute value sign on the right side of the equation (1) is an expression that gives a larger value indicating the presence of a collision if the distance between the centers of the objects i and j is smaller than the sum of the radii of the objects i and j, and otherwise gives a smaller value indicating the absence of a collision.

Therefore, a larger value of the collision cost $Col_{ij}(k)$ indicates a larger number of frames, in each of which the objects i and j collide with each other.

$$Col_{ij}(k) = \sum_{t \in T_{ij}(k)} \left| (x_t^i - x_{t+k}^j)^2 + (y_t^i - y_{t+k}^j)^2 < (r_t^i)^2 + (r_{t+k}^j)^2 \right| \quad (1)$$

The generation unit 105 employs simulated annealing to find a start time yielding the minimum collision cost $Col_{ij}(k)$ for all the combinations of objects. Simulated annealing makes it possible to efficiently calculate a nonlinear problem with restrictions on range.

Therefore, the generation unit 105, as employing simulated annealing, is capable of calculating the start time of each object so that an overlap of objects can be prevented as much as possible. The generation unit 105 thus changes an appearance starting order of objects, while maintaining spatial positions of the objects in the original video, to generate a summary video. Specifically, a summary video is generated by pasting an image of the object, which has been cut from the original video using a pixel mask, on a background image based on the calculated start time.

While the determined relative arrangement of the objects with the motion trajectories 301 and 302, on which the relation information exists, is maintained, an energy function is defined with respect to the objects with the motion trajectories 303 and 304 excluded from the combination of the objects with the motion trajectories 301 and 302 so that less trajectory collisions can occur between the objects and the total reproduction time can be reduced as compared with the total reproduction time of the original video. Then, the start time is determined using the simulated annealing as discussed in Japanese Patent No. 5355422.

Consequently, the start time table 1000 of the objects, which less collide with other objects and are reduced in total reproduction time, is determined while the relative arrangement of the objects, between which the getting on/off has occurred, is maintained not only spatially but also temporally.

In step S1105, a summary video is generated in the generation unit 105 based on the start time table 1000 of the objects. The summary video is generated by pasting an image of the object, which has been cut from the original video using a pixel mask, on a background image based on the calculated start time.

Figure 8A:
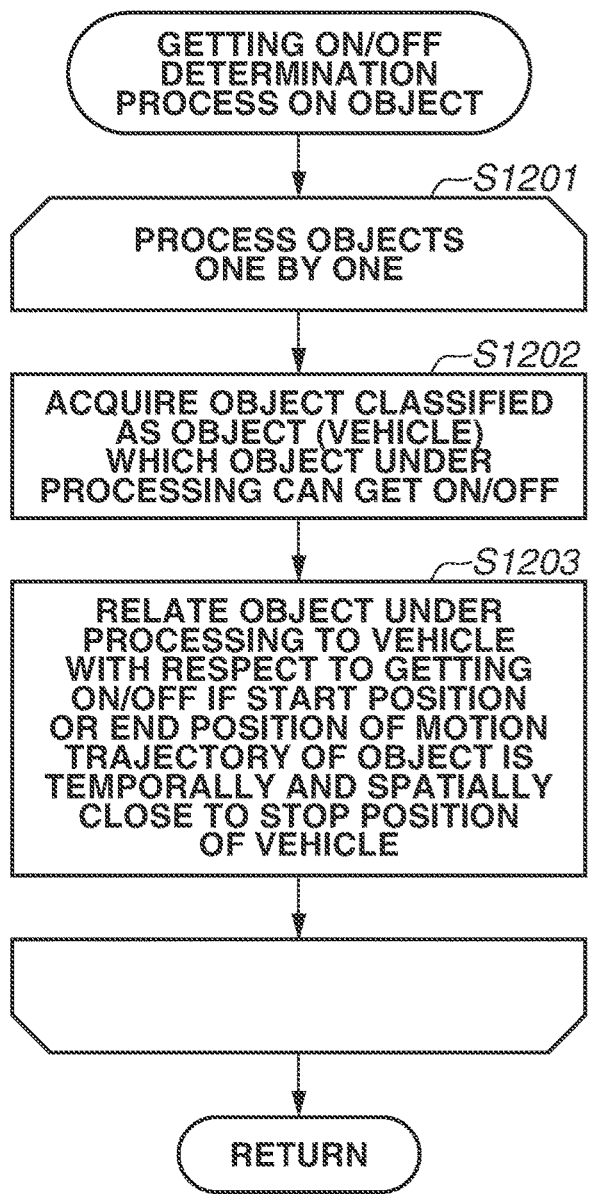
FIG. 8A is a flowchart illustrating an example of processing performed by the determination unit according to the exemplary embodiment.

FIG. 8A is a flowchart illustrating an example of processing performed in the determination unit 103 in the present exemplary embodiment.

In step 1201, the determination unit 103 processes the objects in the object information table 700 sequentially, and the processing is carried out in the subsequent steps.

In step 1202, a plurality of objects whose types are each classified as an object, which a certain object can get on/off, is acquired, and the processing proceeds to step S1203. The object with the motion trajectory 301 belongs in the type of "person" as an extraction condition and, accordingly, can get on/off an object whose type is classified as a motorcycle (also referred to as "two-wheeled vehicle"), an automobile (also referred to as "four-wheeled vehicle"), a truck, a ship, a helicopter, an airplane or the like. The exemplary objects include a moving body such as a robot with no wheels but legs and another type of moving body such as a flying body including a drone with propellers, and such objects can each apply to either of an object getting on/off and an object to be got on/off.

In the present exemplary embodiment, the objects with the motion trajectories 302 and 305 whose types are each classified as an automobile that is an object, which the object with the motion trajectory 301 can get on/off, are acquired.

In step S1203, the determination unit 103 relates the object as a person to the object as a vehicle with respect to the getting on/off, in a case where the start point or the end point of a motion trajectory of the person is close to a point indicating a temporary stop of the vehicle in a temporal and spatial relationship. Thereafter, the determination unit 103 processes the next object.

Specifically, the motion trajectory table 800 of the objects as a person and a vehicle are used to determine the getting on/off. The getting on/off is determined based on a ratio of an overlap between the center coordinates and the radius at the first time and the last time of the motion trajectory of the object and the center coordinates and the radius at the time when the vehicle has stopped.

The vehicle is determined to stop in a case where the distance between the center coordinates of the motion trajectory of the vehicle at a given time and either of the center coordinates at time prior to the given time and the center coordinates at time posterior to the given time is of a value not more than the threshold.

The determination unit 103 determines that the object has got off the vehicle in a case where the value of $(r_{os}+r_v-d_s)/(r_{os} \times 2)$ is not less than the threshold. In the expression, $r_{os}$ represents a radius in the start position of the motion trajectory of the object, $r_v$ represents a radius in the stop position on the motion trajectory of the vehicle, and $d_s$ represents a distance between the center coordinates of the object and the center coordinates of the vehicle.

It is determined that the object has got on the vehicle in a case where the value of $(r_{oe}+r_v-d_e)/(r_{oe} \times 2)$ is not less than a threshold. In the expression, $r_{oe}$ represents a radius in the end position of the motion trajectory of the object, $r_v$ represents a radius in the stop position of the vehicle, and de represents a distance between the center coordinates of the object and the center coordinates of the vehicle. In the present exemplary embodiment, the determination unit 103 determines that the object with the motion trajectory 301 as a person has got on the object with the motion trajectory 302 as an automobile.

Figure 8B:
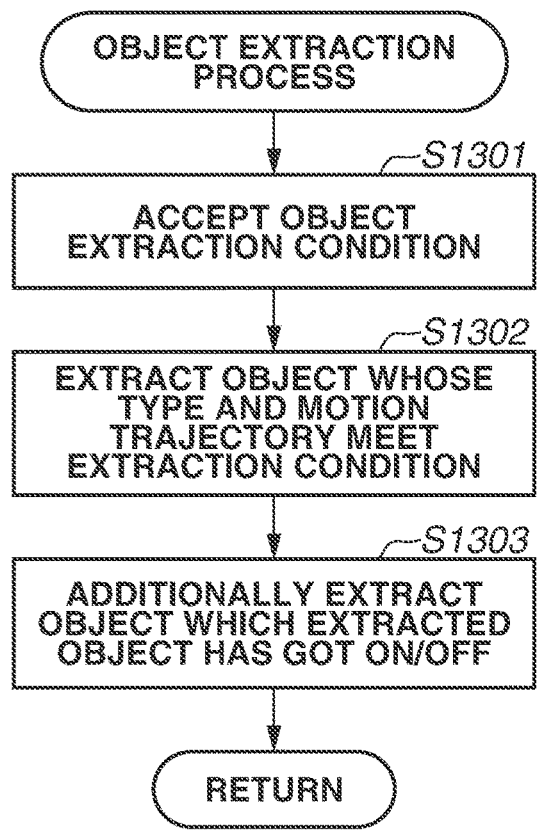
FIG. 8B is a flowchart illustrating an example of processing performed by an extraction unit according to the exemplary embodiment.

FIG. 8B is a flowchart illustrating an example of processing performed in the extraction unit 104 in the present exemplary embodiment.

In step S1301, the extraction unit 104 accepts an object extraction condition from the input device 204, and the processing proceeds to step S1302.

The extraction condition is accepted through a graphical user interface displayed on the output device 205, while any method is available as long as the method allows the acquisition of the extraction condition.

Examples of the extraction condition to be input include the type of an object and the motion trajectory by a hand-drawn line of an object. A type of an object is classified as a person, a motorcycle, an automobile, a truck, a ship, a helicopter, an airplane or the like, and a combination of such types can be input. It is also possible to input a hand-drawn line through a graphical user interface as a motion trajectory. In the present exemplary embodiment, it is assumed that "person", which is the type of an object, is input as an extraction condition.

In step S1302, an object that meets the accepted extraction condition is extracted, and the processing proceeds to step S1303.

Since "person" has been input as an extraction condition, the objects with the motion trajectories 301, 303, and 304, whose types are each classified as a person, are extracted from the objects. In step S1303, the object with the motion trajectory 302, which the object with the motion trajectory 301 as extracted in the previous step S1302 has got on/off, is additionally extracted from the relation information table 900, and the processing ends.

As described above, the object (automobile) with the motion trajectory 302, which the object (person) with the motion trajectory 301 has got on/off, is added, while the object (automobile) with the motion trajectory 305, which the object (person) with the motion trajectory 301 has not got on/off, is not added. As a result, the objects with the motion trajectories 301, 302, 303, and 304 are eventually extracted as objects to be extracted.

Thus, an object (person) and an object (automobile), which the object (person) has got on/off, are extracted, and the video generation device generates a summary video while maintaining the relative appearance order of the object (person) getting on/off and the object (automobile) to be got on/off.

Consequently, in the summary video where an object (person) gets on/off another object, such an event as the sudden appearance or disappearance of the object (person) can be prevented. Therefore, the video generation device is capable of generating a summary video with no strangeness.

In the exemplary embodiment as described above, an object processed for the video synopsis is extracted according to the type of the object, which is merely an example. As a modification, an exemplary embodiment, in which a hand-drawn line input is used to extract an object that has got on/off a vehicle, is described below.

Figure 9A:
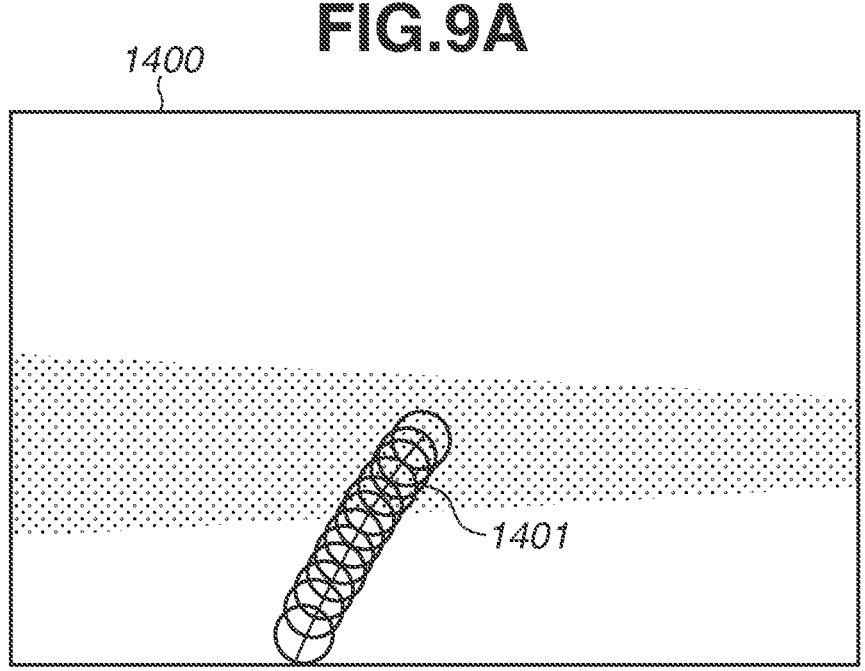
FIGS. 9A and 9B are diagrams, in each of which an example of a motion trajectory received by a reception unit in a first modification of the exemplary embodiment is plotted on a background image.
Figure 9B:
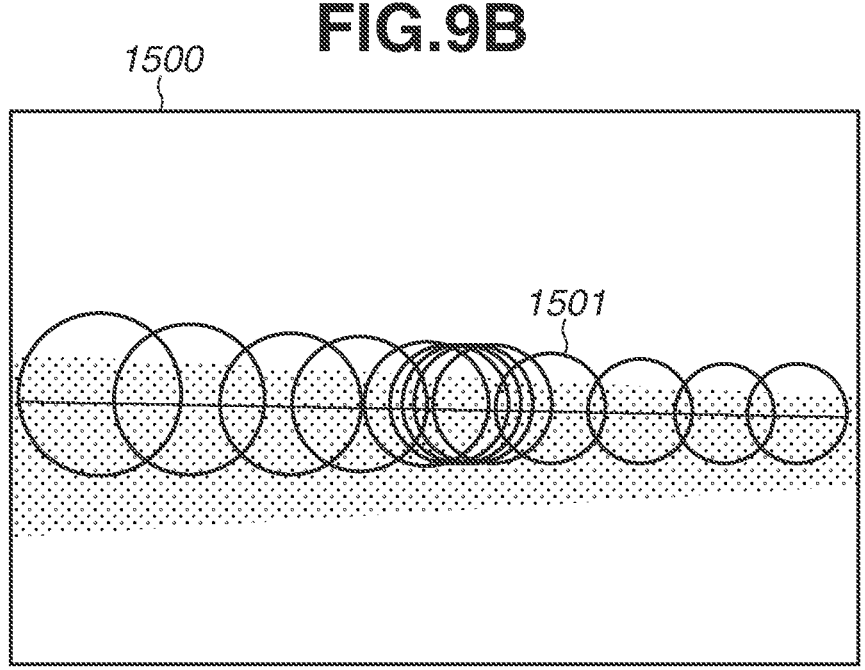

FIGS. 9A and 9B are each a diagram, in which an example of a motion trajectory received by the reception unit 102 in the present exemplary embodiment is plotted on a background image. In FIG. 9A, a motion trajectory 1401 illustrated on a background image of the recorded video based on the values of the center coordinates and radius of the object with the motion trajectory 301 at all times corresponds to the motion trajectory 301. In FIG. 9B, a motion trajectory 1501 illustrated similarly to the motion trajectory 1401 corresponds to the motion trajectory 302.

Figure 10:
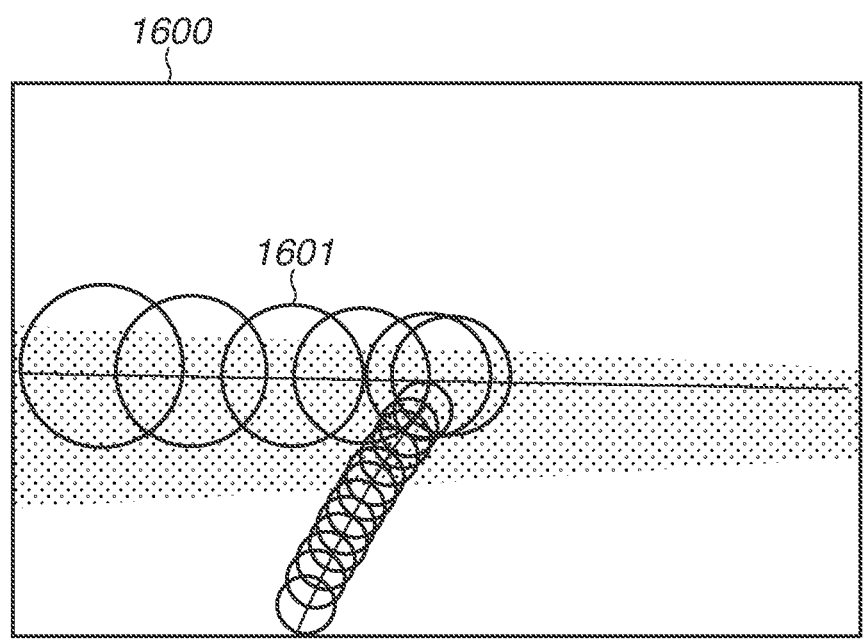
FIG. 10 is a diagram, in which an example of a motion trajectory generated by a determination unit in the first modification of the exemplary embodiment is plotted on a background screen.

FIG. 10 is a diagram, in which an example of a motion trajectory generated by the determination unit 103 in the present exemplary embodiment is plotted on a background screen. FIG. 10 illustrates a motion trajectory 1601 that is generated anew by combining the motion trajectory 1401 of the object with the motion trajectory 301 and a part of the motion trajectory 1501 of the object with the motion trajectory 302.

FIG. 11A is a diagram illustrating an example of a hand-drawn line accepted by the extraction unit 104 in the present exemplary embodiment. The hand-drawn line is drawn with a mouse or a stylus included in the input device 204 on a graphical user interface displayed on the output device 205. In the present exemplary embodiment, a mouse is used to draw a hand-drawn line 1701 on a screen, on which the background of a recorded video is shown.

FIG. 11B is a diagram, in which a trajectory by a hand-drawn line accepted by the extraction unit 104 in the present exemplary embodiment is plotted on a background screen. A trajectory 1801 by a hand-drawn line is the hand-drawn line 1701, on which a circle having a specified radius is plotted repeatedly at constant intervals.

Figure 12:
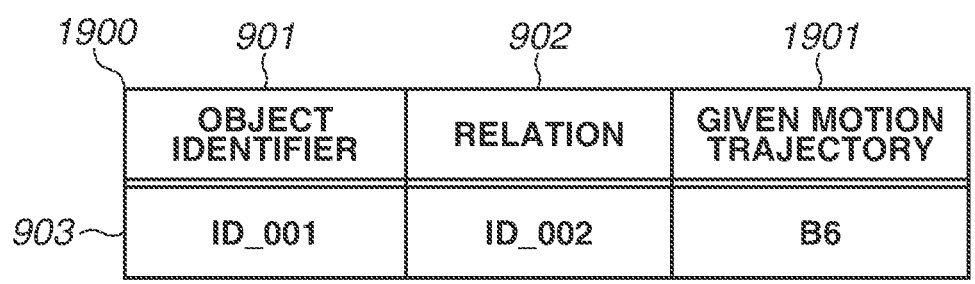
FIG. 12 is a diagram illustrating a table indicating an example of relation information of an object, which is generated by the determination unit in the first modification of the exemplary embodiment.

An example of the relation information of an object, which is generated by the determination unit 103, is explained using a table illustrated in FIG. 12. A relation information table 1900 of an object is information generated by the determination unit 103 based on the object information table and the motion trajectory table. Reference signs 901, 902, and 903 denote the same elements as in the relation information table of an object illustrated in FIG. 5.

A given motion trajectory in a column 1901 indicates a motion trajectory that is added when the relation information is given. A given motion trajectory B6 refers to the motion trajectory 1601 illustrated in FIG. 10.

FIG. 13A is a flowchart illustrating an example of processing performed in the determination unit 103 in the present exemplary embodiment.

The processes in steps S1201, S1202, and S1203 are the same as those in FIG. 8A, so that the description of the processes is omitted. In step S2001, the determination unit 103 gives an object (person), as a motion trajectory to be used during the object extraction, a motion trajectory that is obtained by combining the motion trajectory of the object (person) with a motion trajectory of the object (person) in an object (automobile). Specifically, a portion of the motion trajectory of an automobile closest to an object (person) when the object (person) is determined to get on/off another object (automobile) in the previous step S1203, which is a rear portion in the case of getting on and is a front portion in the case of getting off based on the position of the automobile, is extracted as a motion trajectory in a zone where the object (person) is in the automobile, and is added to the motion trajectory of the object (person).

With respect to the object with the motion trajectory 301 as a person and the object (automobile) with the motion trajectory 302, the motion trajectory 1601, which is obtained by combining the motion trajectory 1401 of the person with a motion trajectory of the zone where the person is in the automobile in the motion trajectory 1501 of the automobile, is given to the relation information table 1900.

FIG. 13B is a flowchart illustrating an example of processing performed in the extraction unit 104 in the present exemplary embodiment.

The processes in steps S1301 and S1303 are the same as those in FIG. 8B, so that the description of the processes is omitted. In step S2101, the object whose type, motion trajectory, and given motion trajectory meet an extraction condition given by a user's operation through the input device 204 including a keyboard or a mouse is extracted, and the processing proceeds to step S1303.

In the present exemplary embodiment, it is assumed that the hand-drawn line 1701 in FIG. 11A is input in the previous step S1301. The hand-drawn line 1701 is converted to the trajectory 1801, and an object with a motion trajectory and a given motion trajectory each conformed to the trajectory 1801 is extracted. Conformation of a motion trajectory to the trajectory 1801 by a hand-drawn line is determined based on whether the motion trajectory includes the trajectory 1801 by a hand-drawn line.

Specifically, circles representing the area of an object on a motion trajectory are scanned in the order of time, and the motion trajectory is determined to include a trajectory by a hand-drawn line in a case where the circles of the motion trajectory include circles of the trajectory by a hand-drawn line while the order of time is maintained. In the present exemplary embodiment, the given motion trajectory of the object with the motion trajectory 301 as a person, which includes a motion trajectory after getting on the object (automobile) with the motion trajectory 302, matches with the trajectory by a hand-drawn line, so that the object with the motion trajectory 301 as a person is extracted.

As described above, a motion trajectory, which is obtained by adding a motion trajectory of an automobile after a person has got on the automobile to a motion trajectory of the person alone, is registered as a single motion trajectory, thereby making it possible to detect more accurately a zone, through which an object as the person has passed.

As the above description is made on an exemplary case where a person has got on an automobile, the present exemplary embodiment is not limited to the relationship between a person and an automobile. A similar method is applicable to the case where a person gets on a motorcycle, a truck, a ship, a helicopter or an airplane. A similar method is also applicable to the case where a motorcycle or an automobile gets on a truck, the case where a motorcycle, an automobile, a truck, a helicopter or an airplane gets on a ship, the case where a motorcycle, an automobile or a truck gets on a helicopter, the case where an automobile or a truck gets on an airplane, and the like. It goes without saying that a similar method is also applicable to the case where the above objects get off any such objects.

An example of the object information received by the reception unit 102 is explained using a table 2200 illustrated in FIG. 14A. The items of the table are the same as the items of the table 700 in FIG. 4A. In the present exemplary embodiment, the type of objects classified as a person, a motorcycle, an airplane, a ship, and a truck, respectively, is registered on the table.

An example of the relation information of an object, which is generated by the determination unit 103, is explained using a table 2300 illustrated in FIG. 14B. The items of the table are the same as the items of the table 900 in FIG. 5. In the present exemplary embodiment, the relation indicating that a person gets on a motorcycle and the relation indicating that the motorcycle gets on a ship are set forth in the table.

As seen from the above, the present exemplary embodiment is applicable to various movable objects including a person and an automobile.

Other Embodiments

The disclosure can also be implemented by a program that realizes part of the exemplary embodiments as above or one or more functions of the exemplary embodiments. In other words, such program is supplied to a system or an apparatus through a network or a storage medium, and one or more processors in a computer (or a CPU, a microprocessor unit (MPU) or the like) in the system or the apparatus read the program to perform processing that allows the implementation of the disclosure. The program can be recorded in a computer readable recording medium and provided as such.

In addition, the disclosure is not limited to the fact that the functions of the exemplary embodiments are realized by a computer that reads and executes the program. For instance, an operating system (OS) or the like at work on a computer can perform part or the whole of actual processing based on an instruction of the program, and the functions of the exemplary embodiments as above can be realized by the processing performed by the OS or the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-233228, filed Dec. 24, 2019, which is hereby incorporated by reference herein in its entirety.

What is claimed is:

1. An information processing apparatus comprising:
one or more memories storing instructions; and
one or more processors which, when executing the instructions, cause the information processing apparatus to
specify a relationship between a plurality of objects detected in a video, wherein the relationship is a relationship between a first object detected in the video based on an extraction condition and a second object to be gotten on or off by the first object;
determine arrangement of motion trajectories of the plurality of objects, the relationship between which has been specified, while maintaining a relative appearance order in the video and avoiding an overlap of the motion trajectories in a temporal direction; and
generate a summary video of the video based on the arrangement,
wherein the summary video includes the first object and the second object for which the relationship has been specified and does not include the second object for which the relationship has not been specified;
wherein the relationship is specified in a case where a start point or an end point of a motion trajectory of the first object is close to a point indicating a temporary stop of the second object in a temporal and spatial relationship.

2. The information processing apparatus according to claim 1, wherein the first object includes at least one of a person, a two-wheeled vehicle, a four-wheeled vehicle, a ship, a helicopter, an airplane, a moving body with legs for movement, a moving body with a wheel, a moving body with a propeller, and a moving body with a wing.

3. The information processing apparatus according claim 1, wherein based on temporal and spatial relationships between a start point or an end point of a motion trajectory of the first object and a point indicating a stop of the second object among the plurality of objects, whether the first object has got on or off the second object is determined.

4. The information processing apparatus according to claim 1, wherein a type of an object is classified by image recognition of appearance.

5. The information processing apparatus according to claim 1, wherein the one or more processors further cause the information processing apparatus to: extract an object that has a motion trajectory meeting a specified condition with respect to the trajectory input by a user.

6. The information processing apparatus according to claim 5, wherein a trajectory including parts of motion trajectories of the plurality of objects in combination is determined to be a motion trajectory of an extracted object.

7. A video synopsis method comprising: specifying a relationship between a plurality of objects detected in a video, wherein the relationship is a relationship between a first object detected in the video based on an extraction condition and a second object to be gotten on or off by the first object; determining arrangement of motion trajectories of the plurality of objects, the relationship between which has been specified in the specifying, while maintaining a relative appearance order in the video and avoiding an overlap of the motion trajectories in a temporal direction; and generating a summary video of the video based on the arrangement determined in the determining ; wherein the summary video includes the first object and the second object for which the relationship has been specified and does not include the second object for which the relationship has not been specified; wherein the relationship is specified in a case where a start point or an end point of a motion trajectory of the first object is close to a point indicating a temporary stop of the second object in a temporal and spatial relationship.

8. A non-transitory program storage medium storing a program for causing a computer to serve as individual units of the information processing apparatus according to claim 1.

9. The information processing apparatus according to claim 1, wherein the relationship is specified based on a ratio of an overlap between a center coordinates and a radius at a first time and a last time of a motion trajectory of the first object and a center coordinates and a radius at a time when the second object has stopped.

* * * * *